July 23, 1929.  W. S. DAVENPORT  1,721,729
WORK SUPPORTING MEANS FOR MACHINE TOOLS
Filed July 27, 1927    3 Sheets-Sheet 1

INVENTOR
William S. Davenport
BY
J. H. Simms
his ATTORNEY

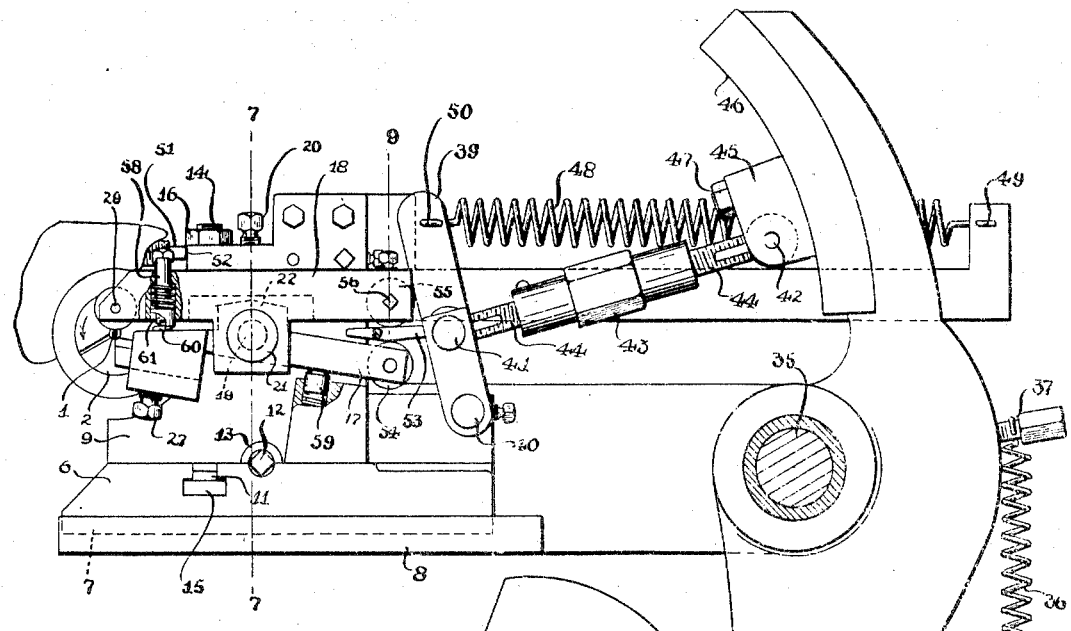

July 23, 1929. W. S. DAVENPORT 1,721,729
WORK SUPPORTING MEANS FOR MACHINE TOOLS
Filed July 27, 1927  3 Sheets-Sheet 3
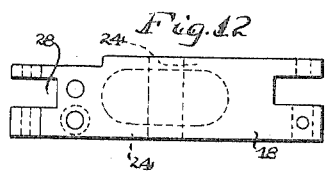
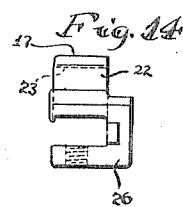
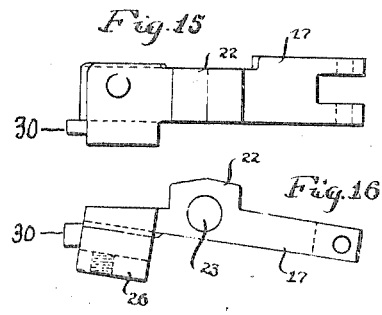
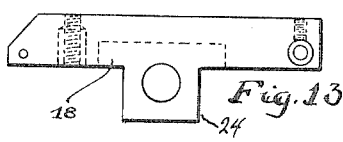
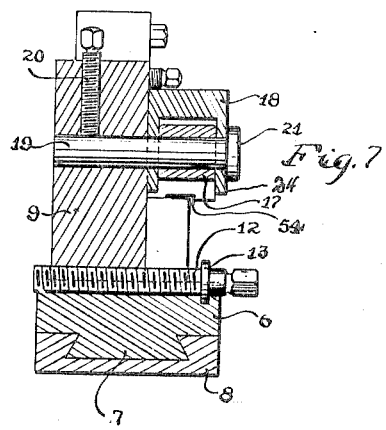
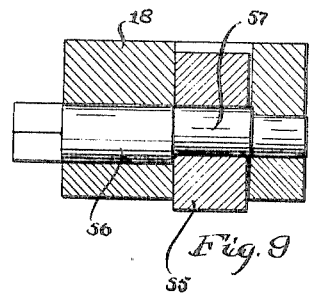
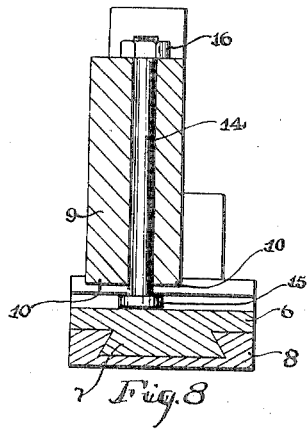
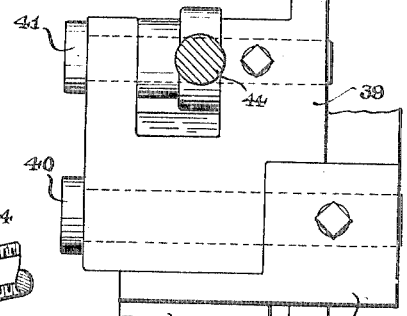
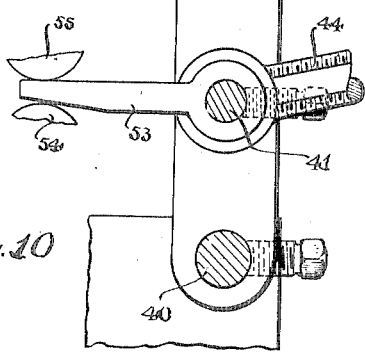
INVENTOR
William S. Davenport
BY
his ATTORNEY Patented July 23, 1929.

1,721,729

UNITED STATES PATENT OFFICE.

WILLIAM S. DAVENPORT, OF ROCHESTER, NEW YORK, ASSIGNOR TO DAVENPORT MACHINE TOOL CO., INC., OF ROCHESTER, NEW YORK, A CORPORATION.

WORK-SUPPORTING MEANS FOR MACHINE TOOLS.

Application filed July 27, 1927. Serial No. 208,830.

The present invention relates to machine tools, and an object thereof is to provide a construction which will accurately form in a screw machine or machine of a similar type, parts which are slender and frail and which are liable to spring away from the cutting tool. Another object of the invention is to provide a construction which will insure greater accuracy of the product than tools previously used, due to the fact, that the work is always supported opposite the cutting tool, so that the work is always made as small as the space between the cutting tool and the support, and cannot be made smaller than the space, provided that the machine is correctly used. Another object thereof is to provide a construction in which the tools are movable toward and from each other on opposite sides of a work piece and are also movable toward and from the work piece so as to permit the work piece to be fed to a working position without any interference with the tools. Another object of the invention is to provide a machine tool in which the two tools are movably mounted on a carrier and the carrier is movable toward and from the work piece, provision being made whereby the tools move toward and from each other when the carrier is moved toward the work piece. Still another object of the invention is to provide a single mechanism which will effect the movement of the carrier toward and from a work piece and which will effect the movement of two tools toward and from each other after the carrier has been moved toward the work piece. A further object of the invention is to provide a carrier movable toward the work piece with a movable member thereon connected with the operating means and having also connection with two tools mounted on the carrier, there being provided means for resisting the movement of said member on the carrier as the latter is moved toward the work piece, the resisting means yielding and permitting the movement of the member on the carrier under the action of the operating means in order to effect the movement of the tools toward and from each other after the carrier has been moved toward the work piece. A still further object of the invention is to provide two pivotally mounted tool holders and a novel means for operating a wedge between said tool holders to effect the movement of the tools toward and from the work piece.

To these and other ends, the invention consists of certain parts and combinations of parts all of which will be hereinafter described; the novel features being pointed out in the appended claims.

In the drawings:

Fig. 5 is a side view with parts in section, showing the tools in cooperation with the work;

Fig. 6 is a plan view of the parts shown in Fig. 5;

Fig. 7 is a section on the line 7—7, Fig. 5;

Fig. 8 is a section on the line 8—8, Fig. 6;

Fig. 9 is an enlarged section on the line 9—9, Fig. 5;

Fig. 10 is a fragmentary enlarged view of portions of the tool operating mechanism;

Fig. 11 is an enlarged view of the swinging member on which operates the tool operating wedge;

Figs. 12 and 13 are respectively top and side views of the upper tool holder; and Figs. 14, 15 and 16 are respectively end, side and top views of the lower tool holders.

Figures 1, 2, 3, 4:
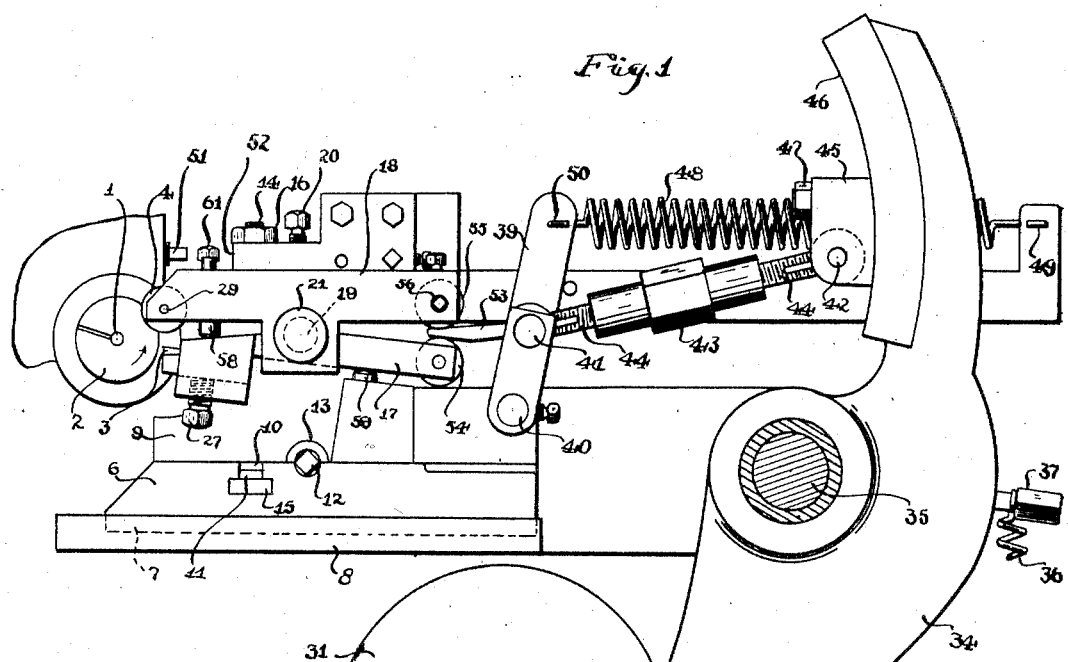
Fig. 1 is a side view of the mechanism with parts in section.
Fig. 2 is an end view of the mechanism adjacent the work piece.
Fig. 3 is a fragmentary view showing the manner in which the tools cooperate with the work.
Fig. 4 is a similar view at right angles with that shown in Fig. 3.

The work 1 which, in this instance, is in the form of a tubular rod fed by any suitable means through a rotary chuck 2 of any suitable construction to successively present portions of the rod to the tools. In this instance, the tools embody a lower cutter 3 and an upper pressure roll 4 both grooved so that from the tubular rod a series of rings may be formed.

The tools are supported, in this instance, upon a reciprocatable carriage 6 having a dove-tailed guide 7 on the underside thereof moving in a dove-tailed groove in a base plate 8. On the carriage 6 is mounted a second carriage 9 which has ribs 10 on the underside thereof operating in a transverse groove 11 in the carriage 6. A worm or screw 12, held by an annular rib 13 against turning in the carriage 6, engages screw threads on the carriage 9 and controls the movement of the carriage 9 on the carriage 6. With the end in view of holding the carriage 9 against movement on the carriage 6 a locking bolt 14 extending vertically through the carriage 9 has a head 15 operating in the groove 11, the groove 11 being of inverted T shape so that the head 15 may be held against longitudinal movement in such grooves. A nut 16 on the upper end of the locking bolt 14 serves to draw the head 15 of the bolt into firm engagement with the walls of the slot 11 and the bottom of the carriage 9 into binding engagement with the upper surface of the carriage 6.

The carriage 9 supports the two tool holders 17 and 18. The former carries the cutter 3 and the latter carries the pressure roll 4. In this instance, a pivot rod 19 is secured in the carriage 9 by a screw 20 and projects from one side of the carriage, its outer end being provided with a head 21. Between this head 21 and the side of the frame 9, the two tool holders 17 and 18 are pivoted on the common pivot rod 19. The lower tool holder has an upward extension 22 with an opening 23 through which the rod 19 extends, while the upper tool holder 18 has two depending ears 24 provided with aligned openings 25 through which the rod 19 extend, the ears 24 lying on opposite sides of the tool holder 17. At the outer end of the tool holders 17 is a depending slotted projection 26 in the slot of which the tool 1 is received being held therein by a set screw 27. A projection 30 extends from the forward end of the tool holder 17 and the other end of this projection serves as a positioning point for the end of the cutter 3 so that such end of the cutter is vertically below the axis of the roller 4. The outer end of the tool holder 18 is provided with a slot 28 in which the roller 4 is mounted, a pivoted pin 29 extending across the slot 28 serves as a bearing for the roller 4.

With the end in view of effecting the movement of the tools toward and from the axis of rotation of the work support and also to effect the relative movement between the tools causing them to operate in engagement with the work after the tools have been brought toward the work, there is provided a novel mechanism comprising, in this instance, a cam 31 on a driven shaft 32. This cam cooperates with a roller 33 on the end of a rocking or swinging lever or member 34 which is pivoted on the shaft 35. A spring 36 is anchored at one end eccentrically to the lever 34 at 37 and at the other end to a fixed part 38 which acts on the lever 34 in a direction to maintain the roller 33 in engagement with the periphery of the cam 31. The lever 34 has above its pivot an adjustable connection with a movable member 39 which, in this instance, is pivoted at 40 to the carriage 9. This adjustable connection, in this instance, comprises a pitman pivoted at 41 to the swinging member 39 and pivoted at 42 to the lever 34. This pitman is preferably adjustable for fine adjustment and to this end comprises a central intermediate sleeve 43 having internal right and left hand threads which engage external right and left hand threads on the end pieces 44 of the pitman. For rough adjustment the pivotal connection 42 with the lever 34 is adjustable and to this end the pivot 42 is mounted on a block 45, which is adjustable on a curved surface 46 formed on the lever 34 and held in its adjusted position by a bolt 47 which connects with the lever 34 in the same manner as the bolt 14 illustrated in Fig. 8.

A means for resisting the movement of the member 39 or the carriage may consist of a spring 48 anchored at 49 to a fixed part and at 50 to the lever 39. This spring acts on the lever 39 to hold the latter against swinging on the pivot 40 when the lever 34 partakes of the first part of its movement and causes the lever 34 to shift the carriage 6 on the guide piece 8. Eventually an adjustable stop 51 on the work support will engage a stop 52 moving with the carriage 6 and the carriage 6 will move no further under the action of the lever 34. At this time, the tools 3 and 4 are located respectively below and above the work piece 1. The carriage 6 having been stopped and the lever 34 continuing its movement under the action of the cam 31, the spring 48 will yield and permit the swinging member 39 to swing forwardly. This arrangement it will be seen provides a lost motion connection between the lever 34 and the carriage 6.

During this lost motion between the operating means for the carriage 6 and said carriage, the tools are moved into engagement with the work piece 1. This is effected, in this instance, through a wedged shaped member 53 pivoted at 41 to the swinging member 39 and operating between two rollers 54 and 55 arranged respectively on the two tool holders 17 and 18. In order to vary the action of this wedge member 15 on the tool holders, one of the rollers, in this instance, the roller 55, is adjustable on its holder. This adjustment, in this instance, is provided by making the shaft 56 of the roller 55 with an eccentric portion 57 on which the roller 55 turns. The turning of this shaft 56 shifts the eccentric portion 57 and thereby varies the position of the axis of turning of the roller 55. The wedge member when it is forced in between the two rollers 54 and 55 swing the tool carriers 17 and 18 on their pivot 19 and move the two tools 3 and 4 into engagement with the work. As the work rotates in the direction of the arrow Fig. 5 the lower cutter 3 will form grooves in the work piece while the upper roll 4 will exert pressure on the work piece to hold it toward the cutter 3. A spring pressed plunger 58 carried by the tool holder 18 acts on the tool holder 17 and the tool holder 17 is also acted upon by another spring plunger 59 mounted on the carriage 9. These two plungers tend normally to hold the two rollers 54 and 55 with yielding pressure toward the wedge member 53 and also tend normally to hold the tools separated. The movement of the tools toward and from each other under the action of the wedge may be adjusted by a threaded bolt 60 which passes through the holder 18 and contacts with an abutment 61 in the holder 17.

The operation of the invention will be understood from the foregoing description but it may be summarized as follows: Assume that the parts are in the positions shown in Fig. 1 at this time the portion of the tubular rod 1 is projected from the chuck or work-holder 2. Thereafter, the lever 34 begins to swing under the action of the cam 31 which first imparts movement to the carriage 6 through the pitman connection 34 and the swinging member 39, but the swinging member does not move on the carriage. Eventually the abutment 52 will engage the abutment 51 and at this time the tools will be diametrically opposite each other on opposite sides of the axis of turning of the work piece. As soon as the carriage 6 is stopped by the abutments 51 and 52, the lever 39 begins to swing on its pivot 40 and forces the wedge 53 between the rollers 54 and 55, thus moving both tools 3 and 4 in engagement with the work piece. The wedge is so formed that, by the time it reaches the high point, grooves will be cut the desired depth in the work piece. When the high point is reached, the lever 34 begins to recede and moves the wedge 55 rearwardly so that the tools 3 and 4 are first separated. Thereafter, the carriage 6 begins to recede until the parts again assume the position shown in Fig. 1. The adjustable connection between the lever 34 and the swinging member 39 permits the movement of the tools 3 and 4 to be varied so as to operate upon work of different diameters. The longer the connection between these two parts the greater will be the throw of the wedge 53. The carriage 9 is adjustable on the carriage 6 so that the position of the tools may be shifted in the direction of the axis of rotation of the work piece.

What I claim as my invention and desire to secure by Letters Patent is:

1. A machine tool comprising a work support, a carrier movable toward and from the work support, a pair of tools movable on the carrier to engage the work and movable therewith to and from the work support, mechanism for moving the carrier to move the tools to work engaging position, and means on the carrier actuated by the carrier moving mechanism for moving the tools into engagement with the work.

2. A machine tool comprising a work support, a carrier movable toward and from the work support, a pair of tools movable on the carrier to engage the work and movable therewith to and from the work support, mechanism for moving the carrier to move the tools to work engaging position, a substantially wedge shaped member on the carrier operative to move the tools into engagement with the work, and a connection between the carrier moving mechanism and the wedge for actuating the latter.

3. A machine tool comprising a work support, a carrier movable toward and from the work support, a pair of tool holders movably mounted on the carrier, tools on the tool holders, a member also movably mounted on the carrier, a connection between said member and the tool holders for effecting the movement of the tools on the tool holders toward and from each other, means connected with said member for effecting the movement thereof on the carrier, and means opposing the movement of said members so that the means, which operates the member first moves the carrier toward the work support and then moves the member to effect the movement of the tools on the tool holders toward each other.

4. A machine tool comprising a work support, a carrier movable toward and from the work support, a pair of tool holders movably mounted on the carrier, tools on the tool holders, a member also movably mounted on the carrier, a wedge operated by said member to move the tools on the tool holder toward each other, resilient means opposing the movement of said member on the carrier, and means connected to said member for first moving the carrier therethrough and then moving the member on the carrier to move the wedge in order to effect the movement of the tools toward each other.

5. A machine tool comprising a work support, a carrier movable toward and from the work support, a pair of copivoted tool holders movable on the carrier, tools on the holders, a member pivoted to the carrier, a wedge moved by said member and operating on the two tool holders to effect the movement of the tools toward each other, resilient means opposing the movement of the pivoted member, and means connected to said pivoted member for first moving the carrier toward the work support and then moving the pivoting member to move the wedge in order to effect the operation of the tools toward each other.

6. A machine tool comprising a work support, a carrier movable toward and from the work support, a pair of tool holders movably mounted on the carrier, tools on the holders, a pivoted member also movably mounted on the carrier, a wedge moved by said member and cooperating with both tool supports to effect the movement of the tools toward each other, means for resisting the movement of the pivoted member on the carrier, and mechanism connected with the pivoted member to move the carrier toward the work support and thereafter to move the pivoted member on the carrier to move the tools toward each other, said mechanism having adjustable means therein for varying the throw of the pivoted member on the carrier.

7. A machine tool comprising a work support, a carrier movable toward and from the work support, a pair of tool holders movably mounted on the carrier, tools on the tool holders, a member also movable on the carrier, connection between said member and the tool holders for effecting the movement of the tool holders toward and from each other, means for resisting the movement of the member on the carrier, a pitman pivotally connected to said member, a lever, to which the other end of the pitman is connected, and means for adjusting the pivotal connection of the pitman on the lever toward and from the axis of turning of the lever.

8. A machine tool comprising a work support, a carrier movable toward and from the work support, a pair of tool holders movably mounted on the carrier, tools on the tool holders, a member also movable on the carrier, connection between said member and the tool holders for effecting the movement of the tool holders toward and from each other, means for resisting the movement of the member on the carrier, a pitman pivotally connected to said member, a lever to which the other end of the pitman is connected, and means for adjusting the length of the pitman.

9. A machine tool comprising a work support, a carrier movable toward and from the work support, a pair of tools, supports on the carrier in which the tools are mounted for movement with the carrier to work engaging position and on the carrier to engage the tools with the work, and means for moving the carrier to move the tool supports to work engaging position and thereafter into engagement with the work.

10. A machine tool comprising a work support, a carrier movable toward and from the work support, a pair of tool supports pivoted on the carrier to swing toward and from each other to engage the work between them, tools in said supports, a device mounted on the carrier and movable transversely of the axis of the tool supports for engaging the tool supports and moving the tools into engagement with the work, and means for moving the carrier to move the tools to work engaging position and actuating said device to move the tools into engagement with the work.

W. S. DAVENPORT.